Figure 1:
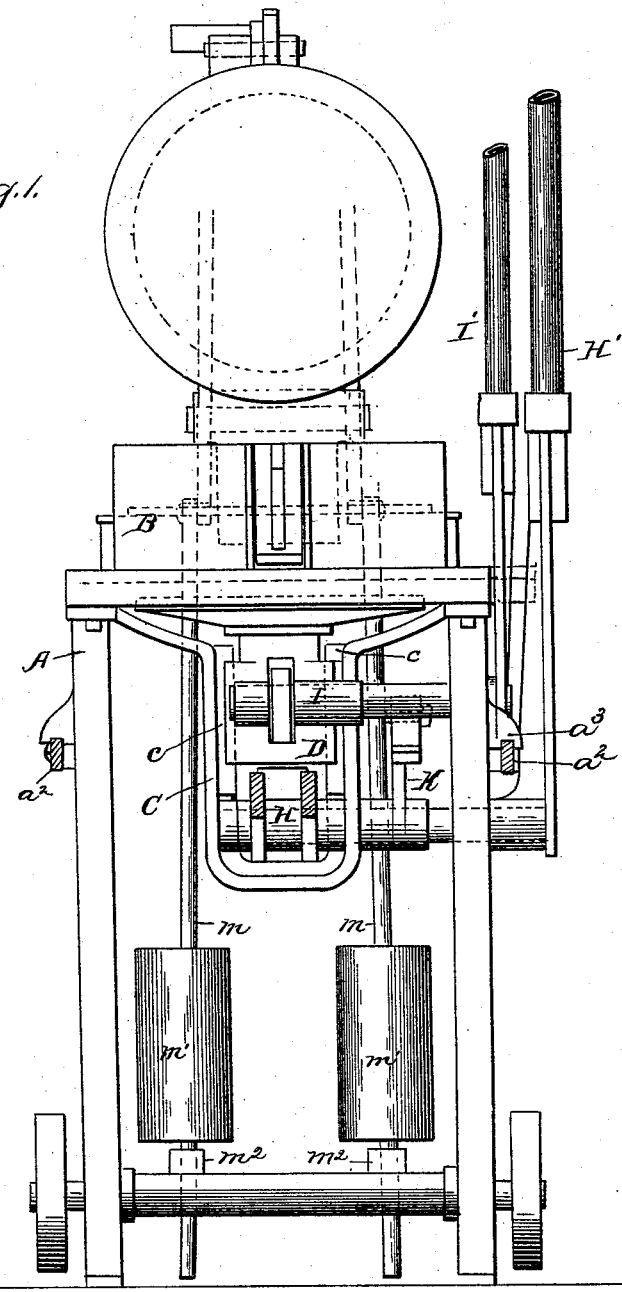

(No Model.) 4 Sheets—Sheet 1.

F. H. VAN HOUTEN.
DOUGH DIVIDING MACHINE.

No. 524,363. Patented Aug. 14, 1894.

Witnesses.
J. M. Fowler Jr.
Aly Stewart

Inventor
Frank H. Van Houten
By Church & Church
his Attorneys.

(No Model.) 4 Sheets—Sheet 2.
F. H. VAN HOUTEN.
DOUGH DIVIDING MACHINE.
No. 524,363. Patented Aug. 14, 1894.
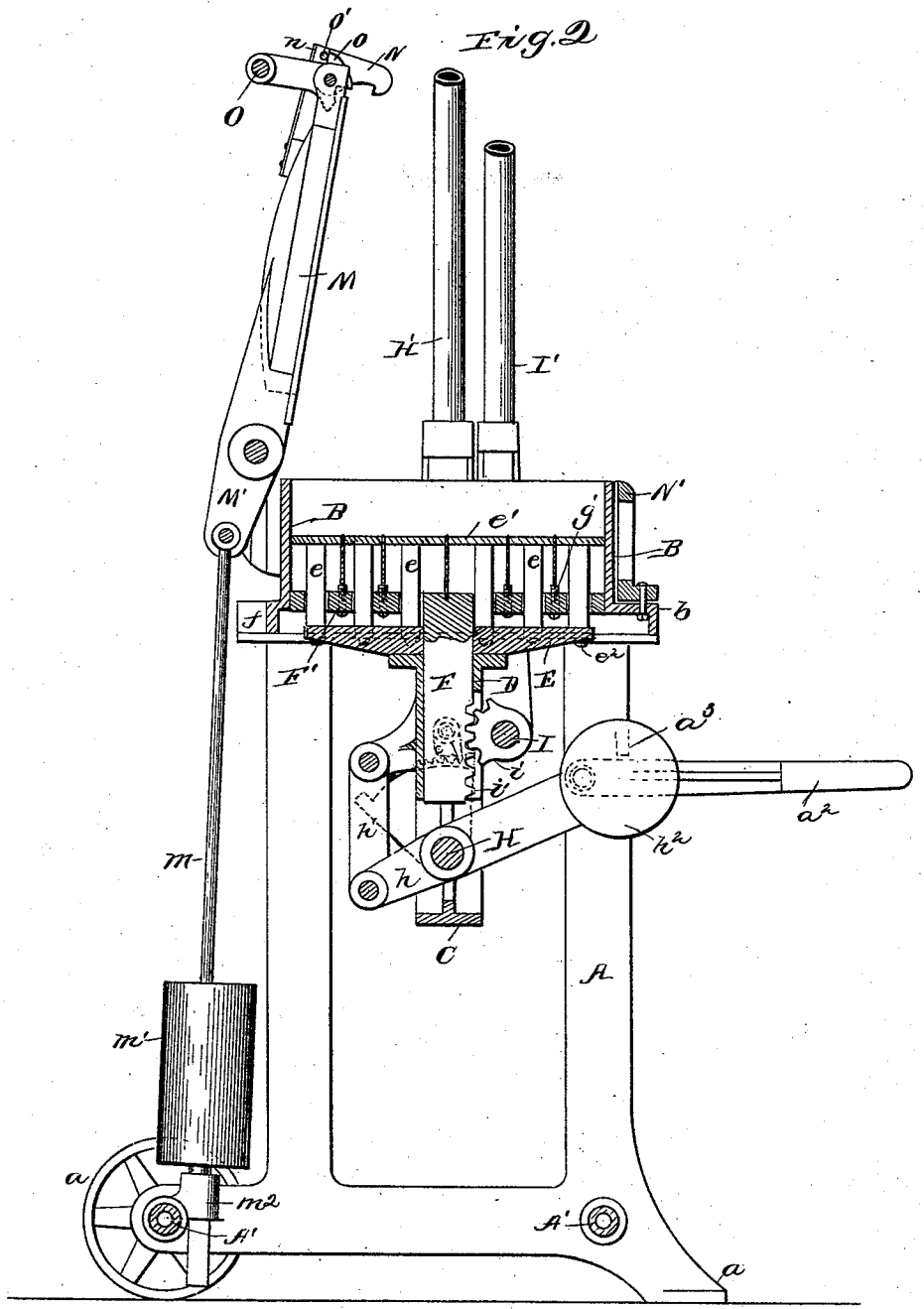

(No Model.)
F. H. VAN HOUTEN.
DOUGH DIVIDING MACHINE.
No. 524,363.
4 Sheets—Sheet 3.
Patented Aug. 14, 1894.
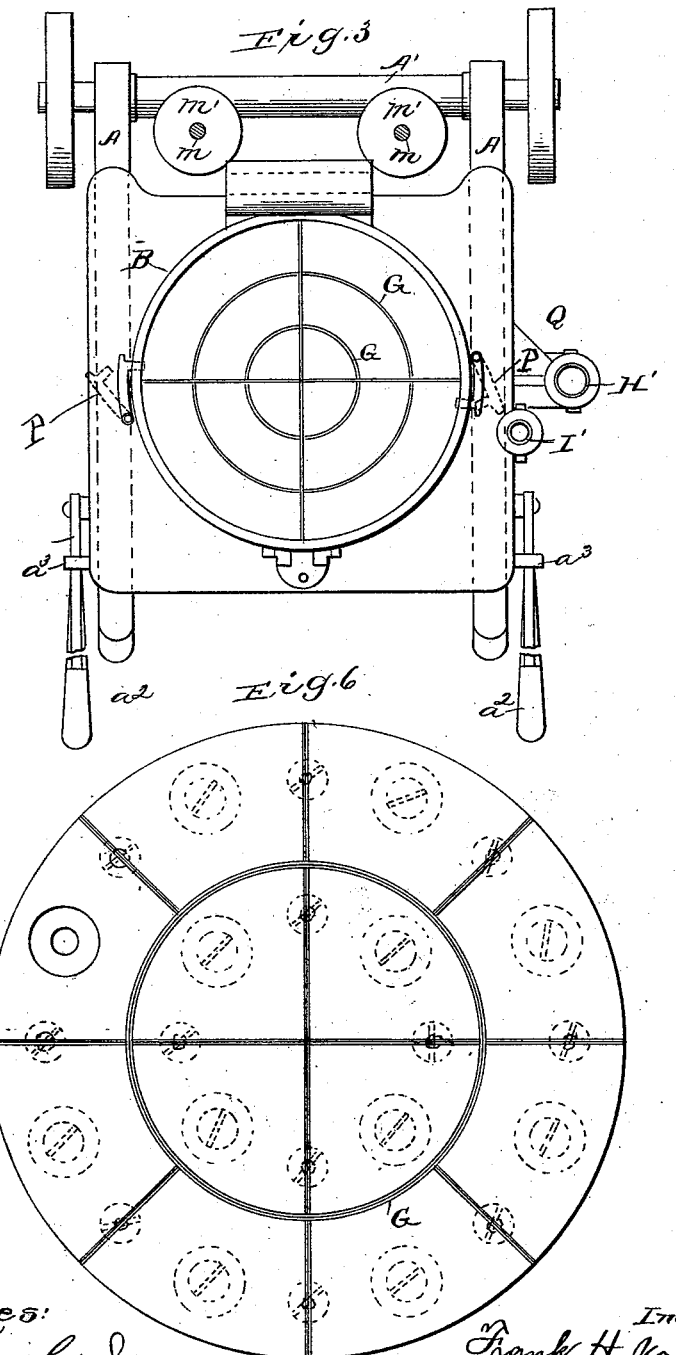
Witnesses:
J. M. Fowler Jr.
Aly J. Stewart
Inventor.
Frank H. Van Houten,
By Church & Church
his Attorneys.

(No Model.)  4 Sheets—Sheet 4.
F. H. VAN HOUTEN.
DOUGH DIVIDING MACHINE.
No. 524,363. Patented Aug. 14, 1894.
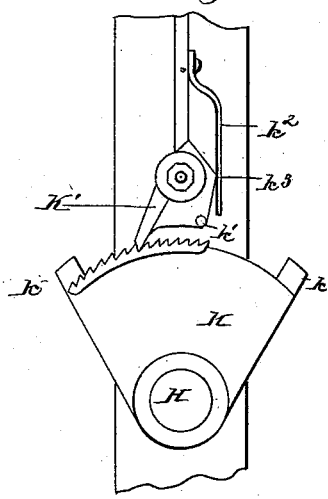
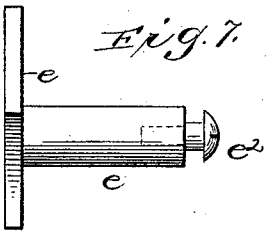
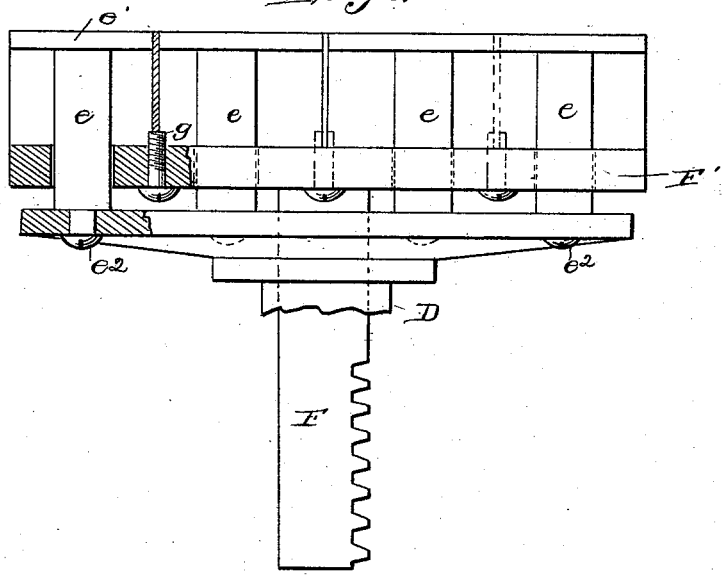
Witnesses
J. M. Fowler Jr.
Aly J. Stewart
Inventor
Frank H. Van Houten
By Church & Church
his Attorneys

United States Patent Office.

FRANK H. VAN HOUTEN, OF FISHKILL-ON-THE-HUDSON, NEW YORK, ASSIGNOR TO THE DUTCHESS TOOL COMPANY, OF SAME PLACE.

DOUGH-DIVIDING MACHINE.

SPECIFICATION forming part of Letters Patent No. 524,363, dated August 14, 1894.

Application filed July 21, 1893. Serial No. 481,131. (No model.)

*To all whom it may concern:*

Be it known that I, FRANK H. VAN HOUTEN, of Fishkill-on-the-Hudson, in the county of Dutchess and State of New York, have invented certain new and useful Improvements in Dough-Dividing Machines; and I do hereby declare the following to be a full, clear, and exact description of the same, reference being had to the accompanying drawings, forming a part of this specification, and to the letters of reference marked thereon.

This invention relates to improvements in machines employed for subdividing dough or similar plastic substances into equal parts, the particular machine herein described and illustrated, being adapted for dividing masses or batches of dough into equal parts of a proper size to form rolls or biscuit.

The objects of the invention are to simplify the construction, and operation of the machine, to render the same more accurate and efficient in operation and at the same time capable of being readily moved or transported around the shop to points convenient to different tables or ovens, &c.

The invention consists in certain novel details of construction and combinations and arrangements of parts, all as will now be described and pointed out particularly in the appended claims.

In the accompanying drawings:—Figure 1 is a front elevation of a machine constructed in accordance with my present invention, some of the parts being broken away to prevent obscurity. Fig. 2 is a section through the body of the machine with the cover in elevation. Fig. 3 is a top plan view with the cover removed. Fig. 4 is a detail elevation of the mechanism for holding the compressor head elevated. Fig. 5 is a detail side elevation and partail section of the compressor head, knife plate and knives. Fig. 6 is a top plan of the same. Fig. 7 is a top and side elevation of one of the sections or plungers forming part of the compressor head.

Similar letters of reference in the several figures indicate the same parts.

In carrying this invention into practice, I provide a base framing or legs A connected at the bottom by girts or cross pieces A' and at the top by the cylinder or receptacle B to be presently described specifically. On the rear girt at the bottom, two wheels $a$ are journaled for supporting the machine at the rear, and at the front, feet $a'$ are provided. This construction insures a steady foundation for the machine while in use, and at the same time permits it to be tilted up for transportation about the shop to convenient points, and with a view to enabling this to be accomplished with the greatest ease, I pivot handles $a^2$ to the front legs A and provide stops $a^3$ for preventing the upward movement of said handles, beyond a horizontal plane, thus the handles may be allowed to swing down beside the legs entirely out of the way, when the machine is in operation, and when it is desired to transport the machine about the shop it is only necessary to turn the handles out into horizontal position.

The cylinder or receptacle before referred to is formed accurately on the inner surface, and at the bottom, is provided with a suitable base or flange $b$ of convenient shape for bolting or otherwise firmly securing it in place on the top of the base framing or legs.

Depending from the cylinder or top of the frame, is a yoke or hanger C, located preferably centrally below the cylinder and having vertical guide ways $c$ thereon upon which works a sleeve head D carrying at the upper end an extended plate or compressor head base E, adapted to support the operative face or faces of the compressor head as will presently appear.

Working vertically within the sleeve head D, is a spindle or equivalent F, carrying at the upper end an extended flat plate F', which I shall herein term the knife base plate, and upon which are mounted the knives for severing the dough or plastic material placed in the upper portion of the cylinder or receptacle. My present construction of these knives deserves special mention, inasmuch, as in this class of machines, the greatest difficulty has been encountered in the manufacture, within a reasonable cost, of knives which will successfully perform their functions. In carrying out my scheme, it will be noted, that I provide a strong and extended base plate fitting accurately within the cylinder, for supporting the knives, and hence the knives themselves may be made of materials and by methods which are much more easily worked than heretofore, thus, I form in the top of the extended base plate suitable concentric and radial grooves, dividing the same off into compartments or divisions of equal area, and support the knives in these grooves.

For the concentric or circular knives I form castings of proper shape and then turn the same up, which process permits of the greatest accuracy of construction, and of the formation of almost absolutely true surfaces, the importance of which will be appreciated by those skilled in the art. These circular or concentric knives lettered G in the drawings, are then fitted in their appropriate grooves in the knife base plate, and screws $g$ passing through said base plate hold them firmly in place. The radial knives being simply flat plates are formed in any suitable manner and fitted into their appropriate grooves in the base plate, it being only necessary to secure them to the base plate by means of screws $g$, as just described, thus the concentric or radial knives are not cut, and the necessity for the employment of a knife frame, or structure in which the knives are all united directly together is, in effect, overcome by the employment of the knife base plate, as described.

The knives, it will be seen from the foregoing, divide the cylinder up into compartments of equal capacity, and through the knife base plate into each of these compartments works the stem $e$ of a plunger or more properly, facet $e'$, the whole of which constitute the face of the compressor head, it being understood of course that the plungers fit accurately into the spaces between the knives and completely close the same to prevent the passage downward of any of the dough or plastic material; the lower ends of the stems $e$ are secured rigidly to the top of the presser head base by means of screws $e^2$ passing up through said base into the lower ends of the stem.

In the construction just described, the bottom for the cylinder or receptacle consists of a movable compressor head and an independently movable set of cutting or dividing knives, and as a convenient means for moving these two parts independently and at the appropriate time, I provide two shafts H and I journaled respectively in the hanger C and in the sleeve head D, the shaft H being connected to the compressor head sleeve by means of the crank arm $h$ and link $h'$ and the shaft I being provided with a pinion or segmental rack $i$ working through a slot in the compressor head sleeve and co-operating or meshing with a rack or toothed section $i$ on the stem F. It is only necessary now to provide handles H' and I' for the respective shafts in order to enable the operator to quickly raise the compressor head and knives.

The weight of the compressor head is preferably counter-balanced by a weight $h^2$ mounted on the opposite end of the crank arm $h$, and in addition, the shaft H is preferably provided with a segmental rack K (Fig.
4) having projections $k$.

On the frame or hanger C, a pawl K' is pivoted, in position to mesh with the segmental rack K and is further provided with a pin $k'$ adapted to be struck by one or the other of the projections $k$ to throw the pawl into or out of engagement with the rack, in either of which positions, it is held by the flat spring $k^2$ working over the shoulder $k^3$ on the pawl. This arrangement enables the shaft H to be moved around and the compressor head set up to any desired point and then the movement completed at a later time, the pawl being thrown out of engagement when the shaft and compressor head have fully completed their movement and again into engagement when the shaft and compressor head have completed their retrograde or backward movements.

Pivoted on the upper portion of the cylinder or receptacle is the cover or closure M adapted to fit accurately down upon the cylinder and effectually and completely close the same. This cover M has a rearwardly extending arm or arms M' to which the upper ends of links or rods $m$ are attached, said links or rods being provided near the base of the machine with weights $m'$ for counterbalancing the weight of the cover. These weights are located near the base of the machine in order to secure greater stability and prevent top heaviness and at the same time to enable the machine to be transported more readily. The rods are prevented from swinging by being passed through bearings $m^2$ on the rear girt $a$. At the forward edge, the cover is provided with a catch N adapted to engage a shoulder N' on the frame, and be held in engagement by means of a flat spring $n$. As a convenient means for handling or moving the cover a handle O is pivoted, preferably on the same pin upon which the catch is pivoted, and the base of this handle is provided with a projection $o$ which co-operates with a pin $o'$ on the catch, to throw the catch out of engagement whenever the handle is pressed backwardly and upwardly, thereby enabling the operator to release the catch and open the cover by a single movement.

The dividing knives have a range of movement which brings them fairly against the under surface of the cover and in order to prevent the strain and pressure from being taken up by the edges of the knives, I provide pivoted stops P at each side of the cylinder, the ends of which project into the cylinder and co-operate with the knife base plate preventing the same from rising too high, and at the same time said stops being pivoted, may be thrown out of position to allow the knife base plate and knives to be raised up above the cylinder for the purpose of cleaning, &c.

From the foregoing description, the operation of the machine will be readily comprehended and is as follows:—The operator having thrown the cover up and the compressor head and knives being depressed, he selects or forms a mass of dough of the proper size and drops the same into the open receptacle or cylinder, then forces the cover down upon the same until the catch engages and retains the cover in place, he then grasps the handle H' and draws it forward until the compressor is forced upward sufficiently to drive the dough out into a flat cake completely filling the upper portion of the receptacle, the plunger being held in this position by the ratchet $k'$, the operator grasps the handle I, and drives it forward, forcing the dividing knives up through the compressor and mass of dough above the same and up against the under side of the cover. This divides the dough into equal parts and the cover may be now thrown up, the handle H' grasped and still further advanced, forcing the compressor again up to the edge of the knives and level with the top of the receptacle, lifting the divided dough away from the knives, and putting it in position to be taken off and otherwise manipulated. The final movement of the compressor carries the rack segment along until the projection $k$ strikes the pin $k'$ on the pawl K and throws said pawl out of engagement, the compressor and its operating handle being then free to return to normal position ready for another operation. The handles come to rest in their upright or normal position against a stop Q located on the side of the main frame as shown particularly in Fig. 3:

Should it be desired to clean the knives and face of the compressor, the latter may be accomplished by throwing the compressor up to the top of the receptacle and the former by throwing the stops P out of operative position and advancing the knives until they project up through the compressor when the latter is at the top of the receptacle.

Having thus described my invention, what I claim as new is—

1. In a dough dividing machine, the combination with the cylinder or receptacle, and the cover closing down on the receptacle, of the movable knife base plate, the knives secured thereon the independently movable compressor working through the base plate and having the enlarged facets between the knives constituting the face of the compressor; and independent operating levers controlling the knives and compressor, substantially as described.

2. In a dough dividing machine, the combination with the cylinder or receptacle and the cover closing down on the receptacle, of the vertically movable knife base plate, the knives secured thereon, the lever for moving said plate and knives, the independently movable compressor head base, the facets working between the knives and forming the face of the compressor head, and the stems passing through the knife base plate and connecting the facets and compressor head base; substantially as described.

3. In a dough dividing machine the combination with the main frame, the cylinder or receptacle carried thereby, the cover closing down on the cylinder and the hanger, of the compressor head sleeve working in bearings in said hanger, the compressor head and its base carried by said sleeve, the spindle working through the sleeve and the knives and base therefor carried by said spindle and working through the compressor head; substantially as described.

4. In a dough dividing machine, the combination with the main frame, the cylinder or receptacle thereon, the cover closing down on the said cylinder, and the hanger, of the compressor head base having the depending sleeve working in bearings in said hanger, the knife base plate having a depending spindle working in the sleeve, the knives carried by the base plate, the facets working between the knives and supported by stems passing through the base plate and secured to the compressor head base, and the operating levers for moving the compressor head and knives independently; substantially as described.

5. In a dough dividing machine, the combination with the main frame, the cylinder or receptacle supported thereon the cover and the depending hanger, of the compressor head having the sleeve working in the hanger, the knife base plate having the depending spindle working in the sleeve, the transverse operating shafts connecting respectively with the stem and sleeve and the operating levers secured on the ends of the shafts; substantially as described.

6. In a dough dividing machine, the combination with the main frame, the cylinder or receptacle supported thereon, the cover and the hanger, of the compressor head having the slotted sleeve working on bearings in the hanger, the knife base plate having the spindle working in the sleeve the transverse shaft having the crank arm, the link connecting said arm and sleeve, the transverse shaft having the pinion thereon meshing with a toothed section of the stem and the operating handles on the ends of said transverse shafts; substantially as described.

7. In a dough dividing machine, the combination with the cylinder or receptacle and cover or closure and the reciprocating compressor head, of the reciprocating knives and the movable stops for arresting the forward movement of the knives when elevated to divide the dough; substantially as described.

8. In a dough divider, the combination with the cylinder or receptacle the cover or closure therefor and the knives working within the cylinder or receptacle, of the compressor head working within and up to the top of the cylinder or receptacle the pawl and ratchet for holding said head at any particular point of adjustment and a trip for releasing the pawl when the compressor head has reached the upward limit of its movement, whereby a retrograde movement may take place; substantially as described.

9. In a dough dividing machine, the combination with the cylinder or receptacle, the cover therefor, the knives reciprocating in the cylinder or receptacle and the compressor head, of the operating shaft for the compressor head, the rack segment having the trip projections at each end, on said shaft, the pawl cooperating with said segment and having the projection cooperating with said trip projections on the segment, whereby the pawl is thrown into and out of operative position, and the opening for holding the pawl in either of its positions of adjustment; substantially as described.

10. In a dough divider, the combination with the main frame, the cylinder or receptacle thereon, and the reciprocatory compressor and knives, of the cover hinged to the cylinder or receptacle, the depending rods connected to the cover in rear of the hinge and the counterbalance weights carried by said rods near the base of the machine, whereby the weight is brought near the floor; substantially as described.

11. A knife for dough dividers formed by the knife base plate having the concentric and radial grooves therein, the circular turned knives in the concentric grooves, the independent straight knives in the radial grooves, and fastening devices uniting the knives and knife base plate, said plate having an aperture or opening leading into each compartment; substantially as described.

FRANK H. VAN HOUTEN.

Witnesses:
JOHN F. SCHLOSSER,
BELLA WILSON.